United States Patent

[11] 3,590,956

[72] Inventor Ronald F. Obergefell
 Cleveland, Ohio
[21] Appl. No. 814,717
[22] Filed Apr. 9, 1969
[45] Patented July 6, 1971
[73] Assignee Houdaille Industries, Inc.
 Buffalo, N.Y.

[54] CROSSOVER VALVE FOR LUBRICANT DISTRIBUTOR
 5 Claims, 4 Drawing Figs.

[52] U.S. Cl. .................................. 184/7,
 251/309
[51] Int. Cl. ................................ F16n 7/14
[50] Field of Search .......................... 184/7, 7 C;
 251/209, 309

[56] References Cited
 UNITED STATES PATENTS
 2,973,058 2/1961 Bricout .................. 184/7
 3,111,299 11/1963 Miller et al. ............ 251/309 X
 3,438,463 4/1969 Gruber ................. 184/7
 3,467,222 9/1969 Gruber ................. 184/7

Primary Examiner—Manuel A. Antonakas
Attorney—Hill, Sherman, Meroni, Gorss & Simpson ABSTRACT: A lubricant distributor for receiving lubricant under pressure from a source and for dividing, metering and directing the lubricant to a plurality of points of use. The lubricant distributor includes a plurality of cylinder piston units in which the pistons are moved reciprocally back and forth by the pressurized lubricant Pairs of outlets corresponding in number to the number of cylinder piston units communicate with the opposite end of the cylinder and serve to discharge lubricant alternately therefrom as the pistons are moved back and forth. Passages are formed in the distributor for cross-connecting the two outlets associated with each cylinder piston unit and a selector valve is associated with each cross connection passage to block or unblock flow therethrough. Each selector valve is carried in a corresponding bore in the distributor for rotation only, and is restrained against axial movement.

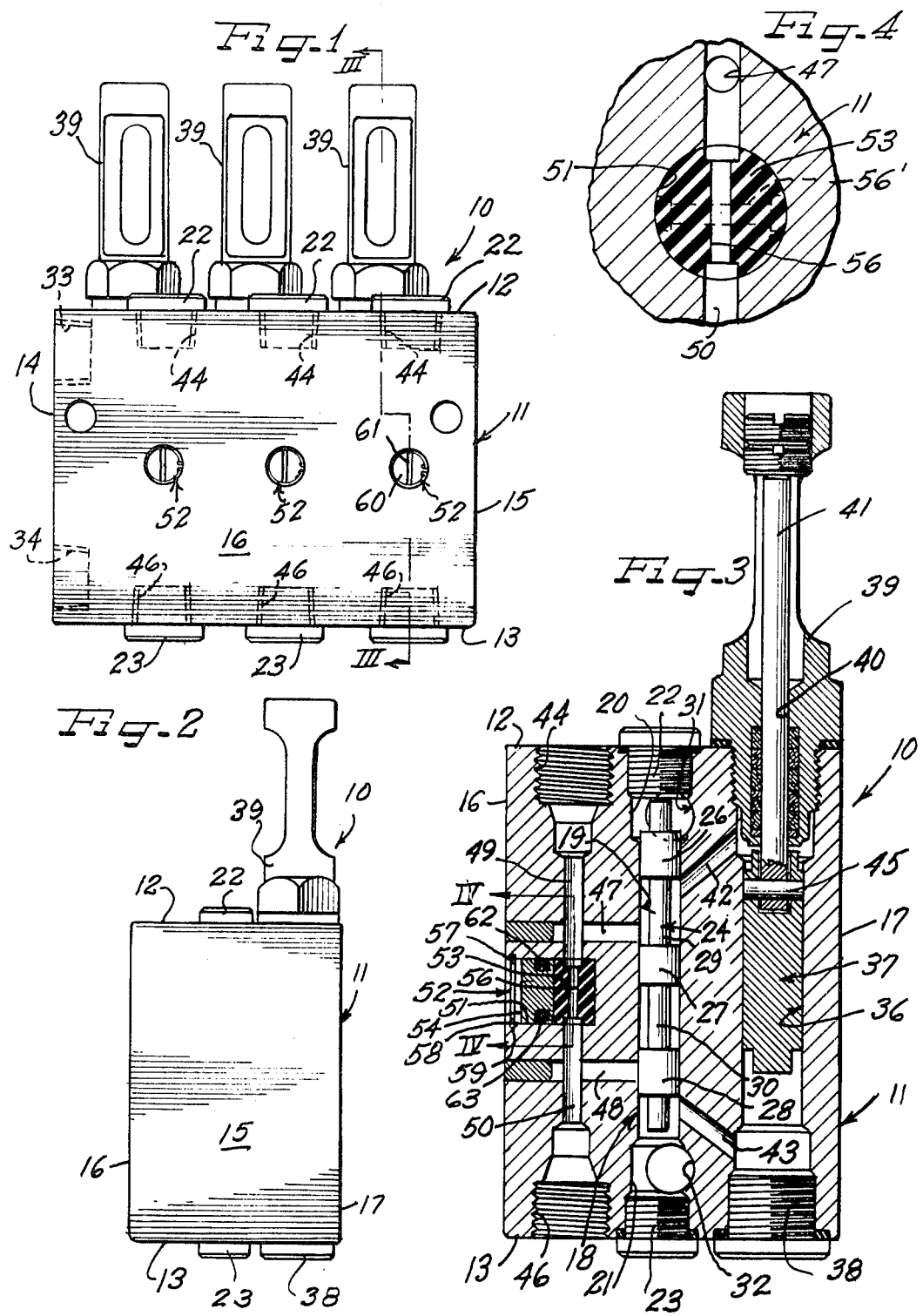

CROSSOVER VALVE FOR LUBRICANT DISTRIBUTOR

BACKGROUND OF THE INVENTION

The present invention relates generally to the field of centralized lubrication systems and more particularly to lubricant distributors of the cylinder-piston type which receive lubricant under pressure from a source and divide, meter and direct it to a plurality of points of use.

In lubricant distributors of this general description the pistons are moved back and forth in their respective cylinders by virtue of the motive force acting thereon and resulting from the pressurized lubricant. A lubricant outlet is connected to each of the opposite ends of each cylinder and as each piston moves in one direction it forces a metered quantity of lubricant out of one of its associated outlets and as it moves in an opposite direction it discharges lubricant from the other outlet.

In some applications the various points of use to which the lubricant distributor is connected require lubricant flow rates and thus it may be desirable to have both outlets of a single cylinder-piston unit connected to a single point of use. To accommodate such interconnection, some distributors of the prior art are internally bored to cross-connect the two outlets of a single cylinder-piston unit. Valve means are generally provided in the cross connection bore so that the two outlets may be selectively interconnected or blocked off from one another.

The provision of a simple, inexpensive, easily operable and self-indicating valve within the cross connection bore of a lubricant distributor is a principle object of the present invention.

SUMMARY OF THE INVENTION

The present invention may be summarized as comprising, in a lubricant distributor as generally described hereinabove, means forming a cylindrical bore communicating with the cross connection bore or passage, a cylindrical valve rotatably carried in the bore and having means forming an axially transverse flow passage for establishing flow in the cross connection passage when rotated to a first position and for blocking flow in said cross connection passage when rotated to a second position and means for restraining said valve against axial movement in said bore.

From this summary it may be ascertained that the invention involves only a single crossover valve member. The single valve member is merely rotated between two positions to establish and block flow between the pair of outlets. Further, the single valve member is restrained against axial movement to further simplify the construction and to facilitate the use of the valve member.

The valve member is accessible from outside the body of the lubricant distributor and has a diametrical slot formed in the outwardly facing end wall thereof for receiving the working end of a screwdriver or similar tool. The disposition of this slot, however, also provides a visual indication of whether the valve is in a flow-blocking or flow-establishing position.

Many other features, advantages and additional objects of the present invention will become manifest to those versed in the art upon making reference to the detailed description which follows and the accompanying sheet of drawings, in which a preferred structural embodiment incorporating the principles of the present invention is shown by way of illustrative example only.

BRIEF DESCRIPTION OF THE DRAWING

FIG. 1 is a front elevational view of a lubricant distributor having multiple cylinder-piston units and constructed in accordance with the principles of the present invention.

FIG. 2 is a side elevation view of the lubricant distributor shown in FIG. 1.

FIG. 3 is a slightly enlarged vertical cross-sectional view taken substantially along lines III-III of FIG. 1.

FIG. 4 is an enlarged sectional view of the valve member taken substantially along lines IV-IV of FIG. 3.

DESCRIPTION OF THE PREFERRED EMBODIMENT

The accompanying drawing is illustrative of one embodiment of a lubricant distributor which includes multiple cylinder-piston units wherein the pistons are moved back and forth in their respective cylinders under the motive force of pressurized lubricant to force lubricant from outlets connected to the ends of the cylinders to various points of use. Lubricant distributors of this general description other than the embodiment illustrated herein are known in the prior art and it should be understood that the present invention finds utility not only in the embodiment of the distributor illustrated herein, but in any other pressurized lubricant operated multiple cylinder-piston distributor.

Referring to the drawing, reference numeral 10 indicates generally a lubricant distributor constructed in accordance with the principles of the present invention. The distributor 10 may be more particularly characterized as comprising a distributor housing 11 having top and bottom walls 12 and 13, sidewalls 14 and 15, and front and backwalls 16 and 17.

In the embodiment illustrated, three cylinder-piston units are provided in the housing 11, one of which is indicated at reference numeral 18 in FIG. 3. Unit 18 comprises a vertical cylinder 19 having enlarged diameter end portions 20 and 21 which are closed off respectively by a pair of threaded plugs indicated at reference numerals 22 and 23.

Slidably carried for reciprocal movement within the cylinder 19 is a piston 24, the illustrated embodiment of which comprises three enlarged diameter land portions 26, 27 and 28 interconnected by means of a pair of reduced diameter groove portions 29 and 30.

A pair of horizontally extending main lubricant supply passageways 31 and 32 extend from wall 14 into the housing 11 and communicate with the enlarged ends portions 20 and 21 of the cylinder 19 as well as of the enlarged end portions of the other cylinders. The passageways 31 and 32 terminate at wall 14 in enlarged lubricant supply ports 33 and 34 constructed and arranged to receive suitable conduits or the like connecting the distributor 10 with a reverse-acting source of pressurized lubricant.

Situated adjacent cylinder 19 and in operative association therewith is another cylinder indicated generally at reference numeral 36. A slidable piston 37 is carried in cylinder 36 and and the lower end of the cylinder is closed by virtue of a threaded plug 38 whereas the upper end of the cylinder 36 receives a stem-mounting arrangement 39 apertured as at 40 to slidably and sealingly receive a stem 41 coupled to the piston 37 by means of a transverse pin 45.

The cylinders 19 and 36 are interconnected by means of a pair of passages 42 and 43 and cylinder 19 is further connected to a pair of main fluid outlets 44 and 46 formed respectively in the top and bottom walls 12 and 13 by means of a pair of horizontal passages 47 and 48 and vertical passages 49 and 50.

In operation, pressurized lubricant supplied to main lubricant supply passage 31 will cause the piston 24 to move downwardly as the same is viewed in FIG. 3. After the land portion 26 of the piston 24 has uncovered the passage 42 the pressurized lubricant will flow from cylinder 19 through passage 42 and into the upper end of cylinder 36, thereby forcing the piston 37 downwardly.

Downward movement of piston 37 forces lubricant from the lower end of cylinder 36 through passage 43, through that portion of cylinder 19 between lands 27 and 28 and into the passage 48, from whence it is conducted through passage 50 to the outlet 46 and thence to a point of use such as a bearing or the like.

The pressurized lubricant is then conducted to the main inlet port 34, forcing the piston 24 upwardly in the cylinder 19. After the land portion 28 of the piston 24 uncovers the passageway 43 the pressurized lubricant is fed into the lower end of cylinder 36 thereby causing the piston 37 to rise in the cylinder 36. The lubricant in the upper end of cylinder 36 is thereupon forced through passage 42 and thence through that portion of cylinder 19 between the land portions 26 and 27 of the piston 24. The lubricant thereupon flows through passage 47 to passage 49 and thence from the outlet 44 to another point of use.

It may be desirable, depending upon the particular lubrication system involved, to have both outlets 44 and 46 of a single cylinder-piston unit 18 connected to a single point of use, To that end, a cylindrical bore 51 is formed in the housing 11 in vertical alignment with passages 49 and 50 and opening to the front face 16 of the housing 11. The adjacent ends of passages 49 and 50 communicate with the bore 51 and disposed within the bore 51 are valve means which may be conveniently referred to as crossover valve means, indicated in the drawing generally at reference numeral 52.

The crossover valve means 52 may be more particularly characterized as comprising a cylindrically shaped resilient valve member 53 bonded or otherwise suitably connected to a rigid member 54 which may be made of metal. The valve member 53 is transversely apertured as indicated at 56 to provide a transverse flow passageway communicating passages 49 and 50 in one position of the valve 52. It will be appreciated, however, that rotation of the valve member 53 from the position thereof shown in FIG. 3 will have the effect of blocking flow between the passages 49 and 50.

The valve 52 is restrained against axial movement by virtue of a lock washer 57 disposed in axially aligned complementarily shaped grooves 58 and 59 formed respectively in the rigid member 54 and the bore wall 51. A front face 60 of the rigid member 54 is slotted as indicated at reference numeral 61 to accommodate the working end of a screwdriver or the like tool to facilitate rotation of valve member 52. A seal member in the form of an O-ring 62 is housed in a groove 63 formed in the peripheral wall of the rigid member 54 to provide a fluid-type seal between the rigid member 54 and the bore wall 51.

If each of the outlets 44 and 46 is intended to service a different point of use, the valve 52 is rotated from the position thereof shown in FIGS. 1 and 3 (at which the slot 61 is vertically disposed) 90° in either direction, thus blocking lubricant flow between passages 49 and 50. In the event, however, that a single point of use is to receive the full lubricant discharge from a single cylinder-piston unit 18, that is, is to receive a charge of lubricant as the piston 24 moves in both directions, the particular one of the outlets 44 and 46 not in use is plugged and the valve member 52 is rotated to the position thereof shown in FIGS. 1 and 3, whereupon the passages 49 and 50 communicate with one another to supply lubricant from that particular one of the outlets 44 and 46 in use during movement of the piston 24 in both directions. The valve members 52 provides an exceptional shutoff when rotated to a blocking position particularly by virtue of the resiliency of the material from which the valve member 53 is formed. Synthetic rubber or the like is particularly well suited for that purpose.

The slot 61 provides a visual indication of the disposition of the valve member 52. Thus, when the slot 61 is vertically disposed, an unblocked position of the valve 52 is indicated. Conversely, when the slot 61 is disposed in a horizontal direction, and a visual indication of a blocking position of the valve 52 is given.

The valve 52 does not require axial movement and is in fact restrained thereagainst. The valving operation also avoids the necessity of movement of the valve member toward and away from a valve seat with the problems of close tolerance machining and wear attendant thereto.

Although minor modifications might be suggested by those versed in the art, it should be understood that I wish to embody within the scope of the patent warranted hereon all such modifications as reasonably come within the scope of my contribution in the art.

I claim:

1. A lubricant distributor comprising
a distributor housing having a piston-cylinder unit therein,
fluid inlet means in said housing communicating with said piston-cylinder unit and adapted for connection to a source of pressurized lubricant,
means forming a pair of lubricant outlets for said piston-cylinder unit,
means including fluid passage and port means in said housing constructed and arranged so as to cause movement of said piston back and forth in said cylinder when subjected to pressurized lubricant from said fluid inlet means and to cause lubricant to issue alternately from each of said outlets as said piston moves back and forth,
means forming a cross connection passage between said outlets, and
valve means for blocking and unblocking flow through said cross connection passage comprising
means forming a cylindrical bore communicating with said cross connection passage,
a cylindrical valve rotatably carried in said bore and having means forming an axially transverse flow passage for establishing flow in said cross connection passage when rotated to a first position and for blocking flow in said cross connection passage when rotated to a second position,
said valve comprising first and second axially adjacent portions one of which is made of resilient material and extends into said cross connection passage and the other of which is made of metal,
said first and second axially adjacent portions being bonded together for joint rotation with one another,
means for restraining said valve against axial movement in said bore, and
said housing including an outer wall and said cylindrical bore having an outer end which opens to said outer wall, whereby said valve is accessible externally of said housing.

2. The invention as defined in claim 1 and including means forming a circumferentially continuous groove in the wall of said second axially adjacent portion of said valve, and an O-ring disposed in said groove to provide a fluidtight seal axially thereacross between the valve and the bore wall.

3. A lubricant distributor comprising
a distributor housing having a piston-cylinder unit therein,
fluid inlet means in said housing communicating with said piston-cylinder unit and adapted for connection to a source of pressurized lubricant,
means forming a pair of lubricant outlets for said piston-cylinder unit,
means including fluid passage and port means in said housing constructed and arranged so as to cause movement of said piston back and forth in said cylinder when subjected to pressurized lubricant from said fluid inlet means and to cause lubricant to issue alternately from each of said outlets as said piston moves back and forth,
means forming a cross connection passage between said outlets,
valves means the blocking and unblocking flow through said cross connection passage comprising
means forming a cylindrical bore communicating with said cross connection passage,
a cylindrical valve rotatably carried in said bore and having means forming an axially transverse flow passage for establishing flow in said cross connection passage when rotated to a first position and for blocking flow in said cross connection passage when rotated to a second position, and
means for restraining said valve against axial movement in said bore, said means comprising means forming axially aligned circumferential slots in the walls of said valve and said bore,
a lockring disposed within said grooves for locking said valve axially in place in said bore, and
said housing including an outer wall and said cylindrical bore having an outer end which opens to said outer wall, whereby said valve is accessible externally of said housing.

4. A lubricant distributor comprising
a distributor housing having a piston-cylinder unit therein, fluid inlet means in said housing communicating with said piston-cylinder unit and adapted for connection to a source of pressurized lubricant,
means forming a pair of lubricant outlets for said piston-cylinder unit,
means including fluid passage and port means in said housing constructed and arranged so as to cause movement of said piston back and forth in said cylinder when subjected to pressurized lubricant from said fluid inlet means and to cause lubricant to issue alternately from each of said outlets as said piston moves back and forth,
means forming a cross connection passage between said outlets,
first cylindrical wall means forming a bore in said housing communicating with said cross connection passage,
a valve member in said bore having second cylindrical wall means in sliding engagement with said first cylindrical wall means for rotatably journaling said valve member in said bore,
means forming an axially transverse flow passage in said valve member for establishing flow in said cross connection passage when rotated to a first position and for blocking flow in said cross connection passage when rotated to a second position, and
means for restraining said valve member against axial movement in said bore,
said housing comprising an outer wall and said bore comprising an outer end which opens to said outer wall whereby said valve member is adjustably accessible externally of said housing,
one of said cylindrical wall means being made of resilient material and the other being made of rigid material.

5. The invention as defined in claim 1 wherein the radial wall of the valve facing the outer open end of the bore comprises means forming a diametrical slot therein for receiving a tool such as a screwdriver and for providing an indication of the position of the valve.